United States Patent [19]

Barnes et al.

[11] Patent Number: 4,707,801
[45] Date of Patent: Nov. 17, 1987

[54] WORD PROCESSING SYSTEM BASED ON A DATA STREAM HAVING INTEGRATED ALPHANUMERIC AND GRAPHIC DATA

[75] Inventors: Johnny G. Barnes, Austin; James N. Chen, Round Rock; Gerald E. Hayes, Austin, all of Tex.

[73] Assignee: International Business Machines Corporation, Armonk, N.Y.

[21] Appl. No.: 894,099

[22] Filed: Aug. 8, 1986

Related U.S. Application Data

[63] Continuation of Ser. No. 493,403, May 11, 1983.

[51] Int. Cl.[4] .............................................. G06F 3/00
[52] U.S. Cl. .................................................... 364/900
[58] Field of Search ... 364/200 MS File, 900 MS File, 364/521; 340/723, 728, 739, 750

[56] References Cited

U.S. PATENT DOCUMENTS

| | | | |
|---|---|---|---|
| Re. 30,743 | 9/1981 | Shelley et al. | 364/520 X |
| 3,986,011 | 10/1976 | Poole et al. | 364/498 X |
| 4,246,578 | 1/1981 | Kawasaki et al. | 340/750 |
| 4,272,767 | 6/1981 | Lacy | 340/722 |
| 4,283,723 | 8/1981 | Bickley et al. | 340/722 |
| 4,330,834 | 5/1982 | Murphy | 364/719 |
| 4,338,599 | 7/1982 | Leininger | 340/721 |
| 4,441,105 | 4/1984 | Van Vliet et al. | 340/750 |
| 4,458,330 | 7/1984 | Imsand et al. | 364/900 |
| 4,475,239 | 10/1984 | van Raamsdonk | 382/57 |
| 4,510,619 | 4/1985 | Le Brun et al. | 382/57 |
| 4,513,390 | 4/1985 | Walter et al. | 364/900 |
| 4,531,120 | 7/1985 | Brownell et al. | 340/723 |
| 4,539,653 | 9/1985 | Bartlett et al. | 364/900 |

OTHER PUBLICATIONS

D. A. Bishop, "New Approach to Display of Graphics in Text Processing Systems", IBM Technical Disclosure, vol. 22, #4, Sep. 1979.

M. Yashiro et al., "Semi-Graphics on Character Display", IBM Technical Disclosure, vol. 24, No. 11A, Apr. 1982.

R. K. DeBry "Character Graphics Using Programmable Character Font", IBM Technical Disclosure, vol. 23, No. 5, Oct. '80, p. 2001.

R. G. Bluethman et al., *Interleaved Graphics & Text*, IBM Tech. Disclos. Bull. (vol. 22, No. 11, Apr. 1980), pp. 4813-4815.

R. K. DeBry et al. "Enhanced Display Extended Character and Graphics Functions38 , IBM Techncal Disclosure, vol. 23, No. 5, Oct. '80, p. 2003.

*Primary Examiner*—Raulfe B. Zache
*Assistant Examiner*—Michael J. Ure
*Attorney, Agent, or Firm*—J. B. Kraft; Thomas E. Tyson

[57] ABSTRACT

A word processing system is provided with an interactive display terminal for displaying by character generation a data stream representative of alphanumeric characters to be printed on a document together with means for printing the characters on the document. The processing system integrates into the data stream, data representative of graphics and converts such integrated graphic data into graphic display characters whereby the graphics may also be displayed through character generation. When printing of the graphics and alphanumeric information to produce documents is required, the data in the data stream representative of alphanumeric characters is applied to the printing means resulting in the printing of the characters and the data in the data stream representative of the graphics is applied to apparatus for producing the graphics such as a plotter to produce the graphic content of the document.

6 Claims, 5 Drawing Figures

WORD PROCESSING SYSTEM BASED ON A DATA STREAM HAVING INTEGRATED ALPHANUMERIC AND GRAPHIC DATA

This is a continuation of application Ser. No. 493,403 filed May 11, 1983.

RELATED APPLICATIONS

This application is related to the following concurrently filed applications which are assigned to a common assignee and are incorporated herein by reference:

Application Ser. No. 493,402, filed May 11, 1983, by Roy E. Karnes, Jr., Rex A. McCaskill and Khoa D. Nguyen and entitled "Printing with a Data Stream Including Merged Graphic and Alphanumeric Data" (docket AT9-83-008), now U.S. Pat. No. 4,555,773.

Application Ser. No. 493,578, filed May 11, 1983, by Donald T. Crehan and Jerold D. Dwire and entitled "Display of Graphics Using a Non-All Points Addressable Display" (docket AT9-83-009), now U.S. Pat. No. 4,556,878.

Application Ser. No. 493,677, filed May 11, 1983, by Danny B. Convis, Donald T. Crehan and Charles J. Lovell and entitled "Internal Image and Bit Array for Display and Printing of Graphics" (docket AT9-83-016), now U.S. Pat. No. 4,555,700.

BACKGROUND OF THE INVENTION

1. Field of the Invention

The present invention relates to word processing systems having interactive display terminals, and more particularly to such systems with terminals having "character box" displays, i.e., displays which form the alphanumeric characters through the generation of such characters in "character boxes" on the display.

2. Description of Prior Art

Word or text processing systems having interactive display terminals permitting an operator to extensively edit and format alphanumeric data which is, in turn, printed out on an associated printer have been in ever increasing demand in the office products and systems field. Since a great many letters, articles to be published and books require some graphic material to be formatted into documents along with the alphanumeric text, there has been a need for improved editing capability with respect to graphics on word processor displays as well as improved expedients for producing documents which contain graphics in addition to alphanumeric data. Improving capability of word processing systems to handle graphics has presented a problem. The best quality graphics is conventionally produced through plotters with styli which can access or address any point on the document and proceed in a vector to any other point on the document. However, conventional word processing systems with interactive display terminals generally operate the display terminal as a character generation or "character box" display. In such a display, an encoded representation of each of a font of characters is stored in a character generator memory, and as each character is to appear on the display during each display refresh cycle, the character generator memory is addressed and the coded representation of that particular character is taken from the memory and displayed in a particular and designated "character box" on the display. However, the form of display most compatible with graphics to be formed on documents by vector means such as plotters would be an All Point Addressable (APA) display. On such displays, the screen is divided into an X,Y matrix of points, each of which may be addressed and turned on in order to create the image. Thus, during the present work on adapting vector graphics producing apparatus such as plotters to word or text processing systems, we are faced with the problem of finding a compatible method of displaying graphic data for editing purposes together with the alphanumeric data conventionally displayed and edited in word processing systems.

The following prior art is representative of the handling of graphics on various displays.

U.S. Pat. No. 4,246,578, I. Kawasaki et al, Pattern Generation Display System, issued Jan. 20, 1981. This patent discloses a display on which both graphics and alphanumeric data may be shown. It does not use a character generator for the alphanumerics. Rather, all displayed material is generated through some sort of an All Points Addressable system.

U.S. Pat. No. 4,272,767, R. H. Lacy, Display System for Displaying Information in the Form of a Horizontally Oriented Curve on a Raster-Type CRT, issued June 9, 1981. In this display terminal for showing both alphanumeric and graphic material, the alphanumerics are generated through character generation but the graphics or curves appear to be generated by some other means involving vectors.

U.S. Pat. No. 4,338,599, S. Leininger, Apparatus for Alpha-Numeric/Graphic Display, issued July 6, 1982 covers a display for graphic and alphanumeric information. While the alphanumeric information appears to be displayed through some sort of character generation, the graphic data is displayed through a different scheme which does not appear to utilize character generation.

U.S. Pat. No. 4,283,723, R. H. Bickley et al, Apparatus and Method for Providing Digital and/or Bar Graph Displays of Measured Quantities, issued Aug. 11, 1981 appears to relate to a very specialized display forming both characters and simple bar graphs through a character generation method. However, the teaching is quite specialized and appears to be in no way suggestive of or related to the production of printed documents and particularly a word processing system controlling the printing of documents on the formation of graphics on such documents.

SUMMARY OF THE PRESENT INVENTION

The present invention provides a solution to the problems involved in the editing of graphics material together with alphanumeric material in a word processing system by providing a word processing system with an interactive display terminal. The display terminal operates in the "character box" mode, i.e., displayed alphanumeric material is formed by character generation. The word processing system further includes a printer for printing the alphanumeric material and a non-character generating graphics producing apparatus such as a plotter to provide the graphics on the document. In order to format and edit the graphics material, the system further includes means for integrating into the data stream of alphanumeric characters, data which is representative of the graphics. For display purposes, the system converts this integrated graphic data into graphic display characters so that the graphics on the display is now formed through character generation or the character box method.

Upon the completion of the editing, the system has means for selectively applying the data in the data stream representative of the alphanumeric characters to printing means for printing the alphanumeric characters on the document and further to apply the data representative of the graphics to graphics producing means such as the plotter so that the graphics may now be formed on the document.

BRIEF DESCRIPTION OF DRAWINGS

Referring now to the drawings, wherein a preferred embodiment of the invention is illustrated, and wherein like reference numerals are used throughout to designate like parts.

DESCRIPTION OF THE PREFERRED EMBODIMENT

Figure 1:
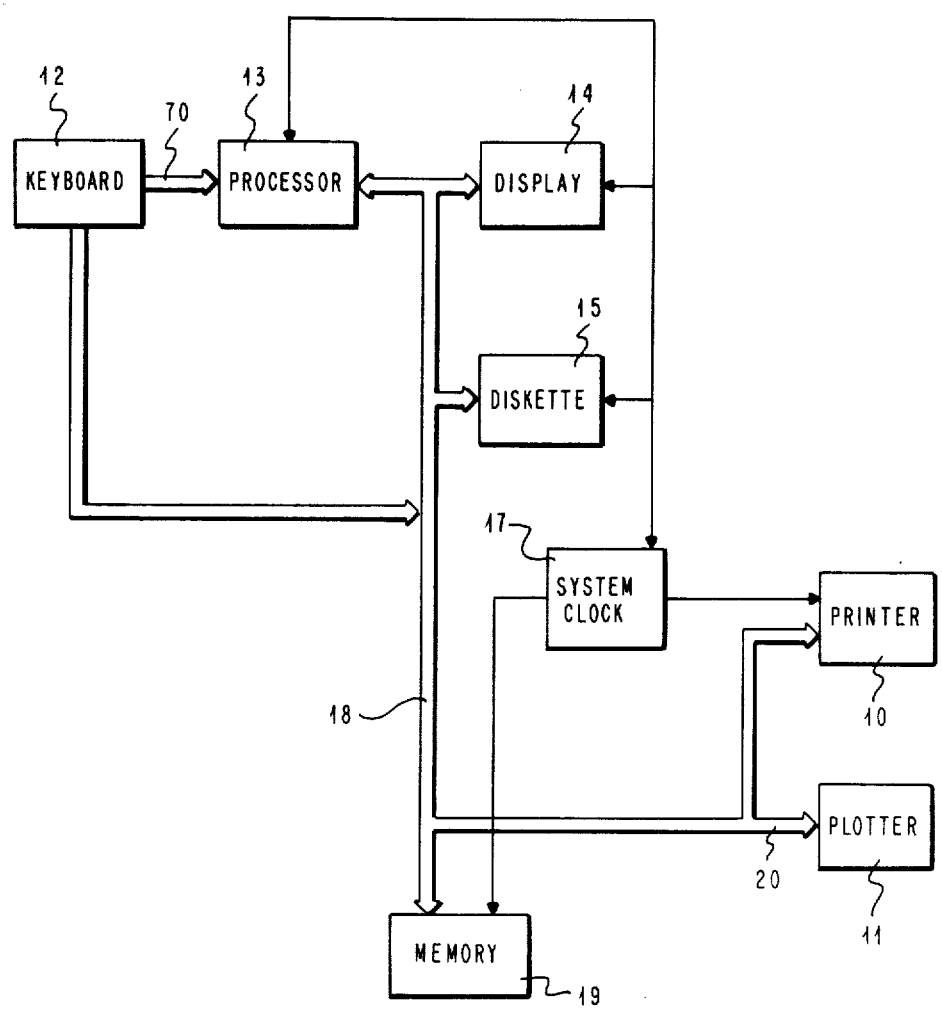
FIG. 1 is a logical block diagram showing the apparatus of the present invention in generalized form.
Figure 2:
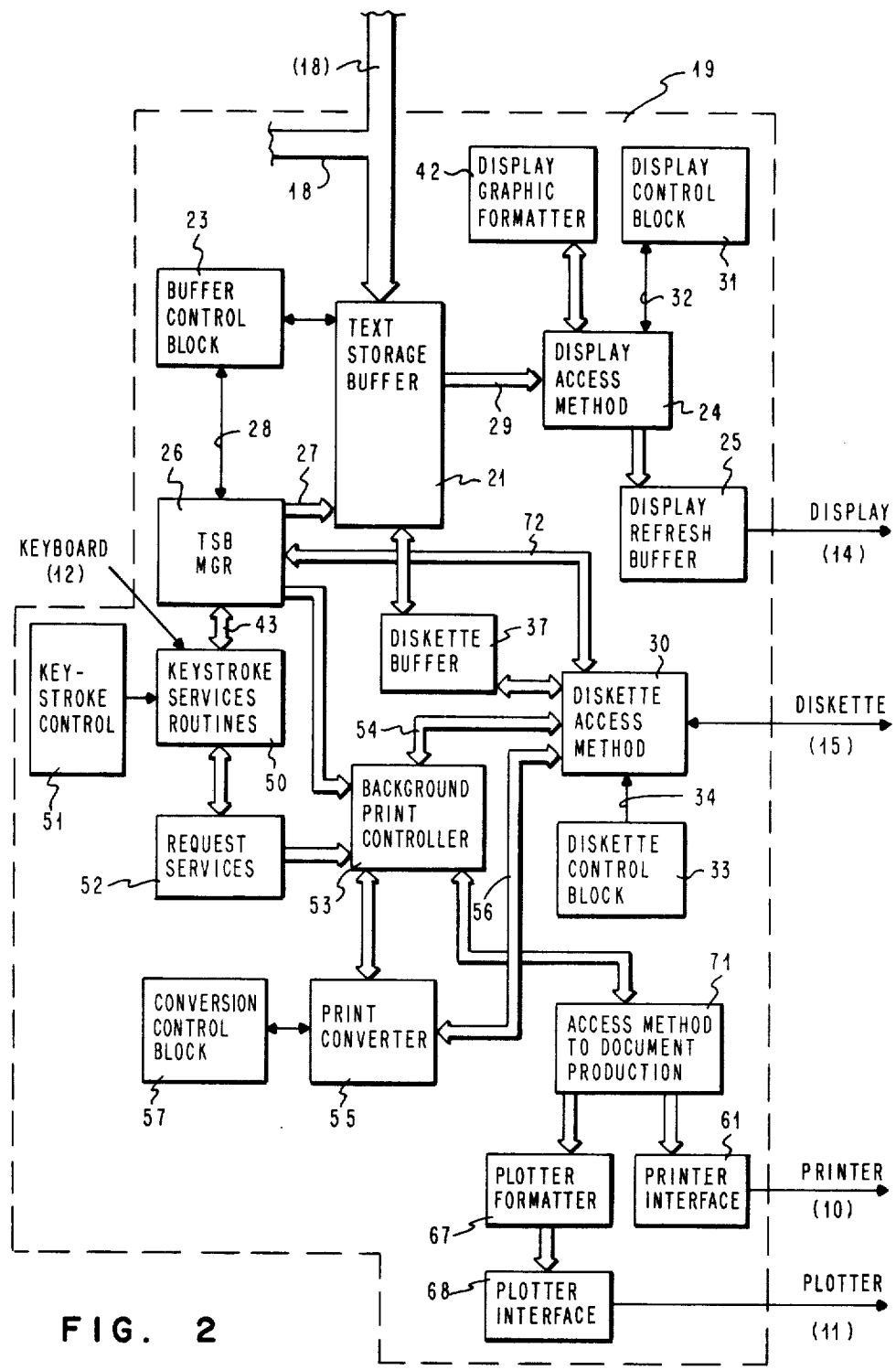
FIG. 2 is a logical block diagram showing the apparatus particularly in the memory portion of FIG. 1 in greater detail so that the steps involved in the present invention may be understood.

With reference to FIG. 1, a generalized view of the apparatus which may be used to carry out the present invention is shown. The apparatus for carrying out this invention may be any conventional word or text processing system such as that described in co-pending application Ser. No. 274,050, Filed June 16, 1981, D. G. Busch, "Data Communications System with Receiving Terminal for Varying the Portions of Received Data Being Displayed". In order to carry out the present invention, attached to the text processing system is a conventional printer 10 which may be any printer such as a daisy wheel printer which prints the alphanumeric text on the document to be produced character by character, i.e., in response to the coded representation of the next character to be printed in a particular data stream applied to the printer, a character is selected from the printer font. Also, connected to the text processing system is a plotter 11 which may be any conventional plotter having a stylus or like element which can access any position on a given document and means for moving the stylus in a vector from the initial point to form a graphic element; the graphic image is, of course, formed by a series of such vector movements. In performing the operations to be subsequently described, the operator accesses the word processor through a keyboard 12. The keyboard drives an internal microprocessor 13 which is operably connected to the display terminal 14 as well as to diskette storage means 15. The keyboard is further connected to random access memory 19 through memory buss 18. A system clock 17 is provided for timing functions within the word processing system. Printer 10 and plotter 11 are communicated with over buss 20. The memory 19 provides means for storing data within the word processing system and also provides the programs for controlling display 14 to display data or control printer 10 to print data or plotter 11 to plot the data. FIG. 2 shows the elements of memory 19 pertinent to the present embodiment and particularly the functional programs which relate to the formatting of graphic data in the display, the integration of such graphic data with the alphanumeric data in the data stream supporting the display and the reproduction of such graphic data on a plotter. With respect to the general operation of the functional areas in memory 19 shown in FIG. 2, data input into memory is sent over buss 18 and stored in the text storage buffer 21 sequentially in the order in which it is received. The handling and updating of data stored in the text storage buffer 21 is controlled by a routine stored within the text storage buffer manager (TSB) 26. Display access method program 24 controls the formatting of alphanumeric text representative of the data stored in the text storage buffer on visual display terminal 14 through display refresh buffer 25. It should be noted that the display refresh buffer 25 may operate in any conventional manner. However, in the present example, a "BUILD" subroutine is used which is described in copending U.S. patent application Ser. No. 208,568, filed 11/20/80, W. C. Cason et al now U.S. Pat. No. 4,445,194.

Text storage buffer (TSB) manager block 26 is connected to text storage buffer 21 by buss 27. The text storage buffer manager block 26 is further connected to buffer control block 23 through a channel 28. As previously indicated, the data representative of the alphanumeric text characters is input into buffer 21. The data representative of characters is stored sequentially in text storage buffer 21 in the order in which it is received. For convenience in description, this data will be referred to as text character data. In displaying the characters, text character data stored in buffer 21 is communicated to display access method 24 over channel 29. It should be noted that corresponding diskette access method block 30 is used instead of access method block 24 when communication between the text storage buffer 21 and the diskette 15 is desired.

A display control block 31 is connected through a channel 32 with display access method block 24. The corresponding diskette control block 33 communicates with diskette access method 30 over channel 34 when access to the diskette drive is required.

Considering now the access of the operator through the keyboard, this involves standard keyboard entry steps. As the operator enters each key stroke at the keyboard 12, a corresponding signal is transmitted through channel 70 to processor 13 which enters the key stroke command into the memory 19. In the memory, upon the receipt of a key stroke command, a key stroke routine produced within the key stroke service routine block 50 is executed to handle the particular command received. This is carried out under the control of the key stroke control block 51. The key stroke command is then processed via channel 43 to the text buffer storage manager block 26 which has been programmed to control buffer control block 23 which carries out various processes with respect to the data stored in the text storage buffer 21.

Figure 3:
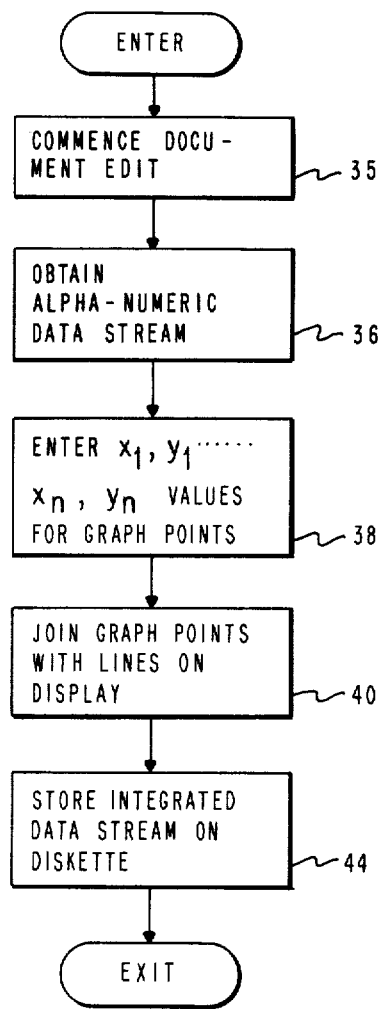
FIG. 3 is a flow chart of the operation involved in the integrating of graphic data into a data stream representative of alphanumeric characters in accordance with the present invention.

Using the standard logic and programming described above with respect to the FIGS. 1 and 2 as well as additional logic and programming functions to be hereinafter described, the operation of the present invention will now be described with respect to steps set forth in the flow charts of FIGS. 3 to 5. It should be noted that the logic and programming shown in FIGS. 1 and 2 relates to the word processing display unit of the type described in co-pending U.S. patent application Ser. No. 208,568 filed Nov. 20, 1980, W. C. Cason et al. Let us assume that the alphanumeric data stream to be used in the printing operation has already been formatted in accordance with the procedure set forth in the referenced patent application and is stored in the diskette memory 15 of FIG. 1. The operator wishes to integrate graphic information into the alphanumeric data stream. The operator commences a document edit session, step 35, FIG. 3, by depressing the appropriate key in keyboard 12 which accesses key stroke service routine 50 in memory 19 through processor 13 of FIG. 1. As a result, step 36, the appropriate alphanumeric data stream is accessed from the diskette 15 through diskette access method 30, FIG. 2. This is brought about by a communication from key stroke service routines 50 through channel 43 to TSB MGR 26 and proceeding through channel 72 to diskette access method 30. The resulting accessed alphanumeric data stream is read into diskette buffer 37 and then stored in text storage buffer 21 from which it is displayed on display 14 through display access method 24 and display refresh buffer 25 in the conventional manner. Next, step 38, the operator enters into the alphanumeric data stream code representative of alphanumeric statements defining the graphic. For purposes of the present example, we are assuming that the graphics are to consist of a simple line graph joining a plurality of points with the coordinates: $X_1, Y_1; X_2, Y_2; \ldots X_n, Y_n$, step 38 to form a graphic structure, e.g., a pie-shaped chart.

Next, step 40, the entered data which is stored in the text storage buffer 21 is sent to display access method 24 which in turn sends the graphic data stream elements to the display graphic formatter 42, FIG. 2. The display graphic formatter 42 uses an interpretive approach wherein points represented by $X_1Y_1; X_2Y_2; \ldots X_nY_n$ are shown on the display and joined by straight lines between the respective points. In doing such graphic formatting, any conventional formatting procedure may be used.

For a specific discussion of a conventional art procedure for such graphic formatting, please refer to *IBM System Journal*, Vol. 19, No. 3, 1980 article by D. F. McManigal and D. A. Stevenson titled "Architecture of the IBM 3277 Graphics Attachment". On page 338 a graphics command decoder is described. It has been stated and described hereinabove that the alphanumeric data formed and edited on the word processor interactive display terminal of the present invention and currently being stored on diskette is character generation data. An encoded representation of each of a font of alphanumeric characters which is stored in the character generator memory of the word processor, and as each character is to appear on the display during a display refresh cycle, the character generator memory is addressed and the coded representation of that particular character is taken from the memory and displayed in a particular and designated character "character box" on the display. In carrying out the present invention, the graphics being formed or edited on the display terminal is similarly represented by a plurality of graphic characters whereby the graphics appearing on the display is also represented by a sequence of coded representations of characters which are taken out of memory and displayed in a particular designated "character box" on the display during display refresh cycle. Details of such a character generation graphic display system which may be used in the practice of the present invention are set forth in the above referenced related application by Donald T. Crehan and Jerald D. Dwire entitled "Display of Graphics Using a Non-All Points Addressable Display" filed concurrently with the present invention. This referenced graphics display system is designed to operate on the same word processing display terminal used in the practice of the present invention. This co-pending application provides for a font of characters which may be used on the display to produce rectilinear and curvilinear graphics.

At this point, step 44, the integrated data stream containing both the original alphanumeric information and the added graphics is sent from the text storage buffer 21 to the diskette 15 via the diskette buffer 37 and diskette access method 30. The editing function is thus completed and the process is exited from.

Figure 4:
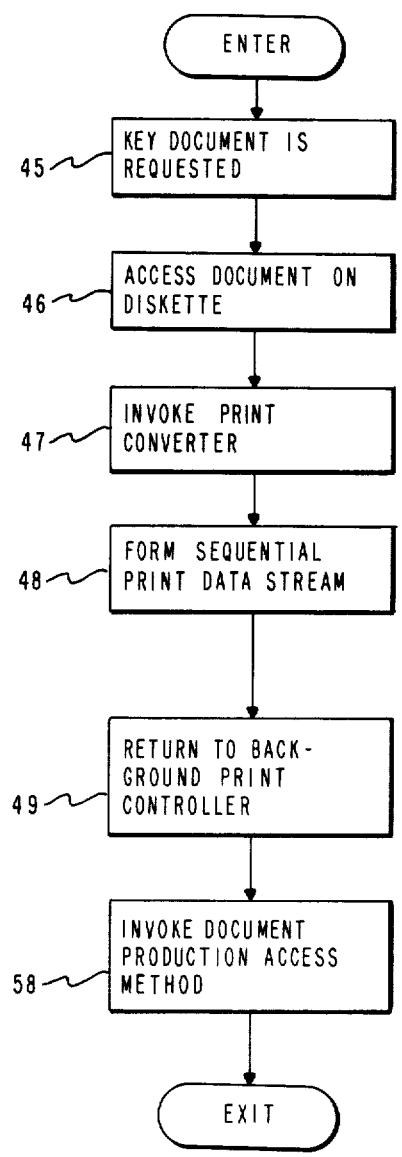
FIG. 4 is a flow chart of the operations involved in the present invention in accessing a data stream containing the integrated alphanumeric and graphic information which has been stored on a diskette and for commencing the operation wherein this accessed data will be utilized to form an appropriate document containing the alphanumeric as well as the graphic information.
Figure 5:
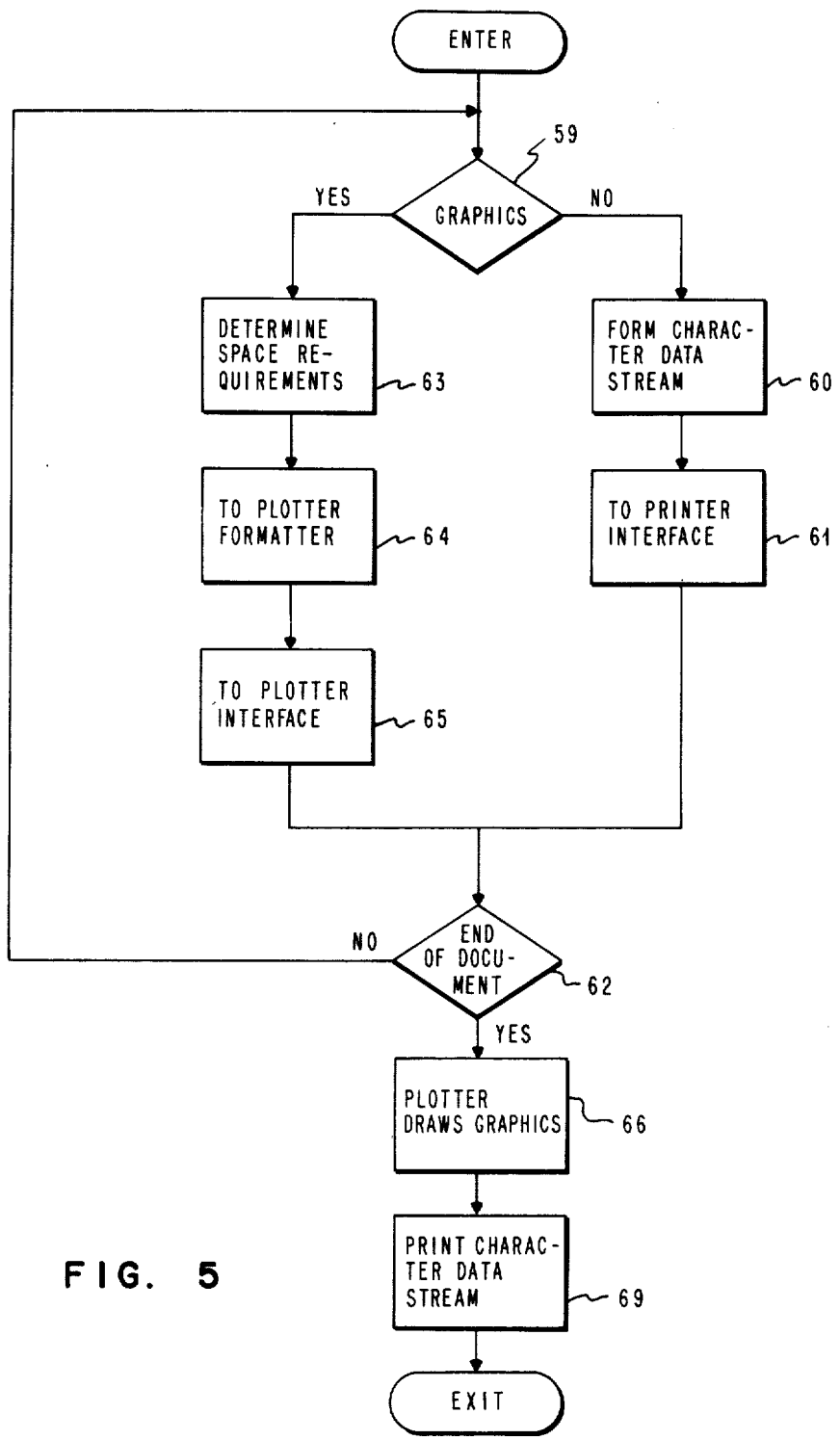
FIG. 5 is a flow chart of the operation involved in selectively applying the data representative of alphanumeric characters to alphanumeric print means and the data representative of graphics to graphic production means.

At a convenient time subsequently when it is desired to produce the document represented by the above described integrated data stream, the print request routine shown in FIG. 4 is invoked by the initial step 45 of the operator requesting the printing of a document through keyboard 12, key stroke services routine 50 and request services 52 through background print controller 53. Under the control of background print controller 53, the printing or production of the document will take place as a background task while the display may be utilized in foreground task involving editing of other text data. Under the control of the background printer controller 53, the above described document which has been stored on diskette 15 is accessed, step 46 of FIG. 4, via diskette access method 30 of FIG. 2 which is connected to background print controller 53 via buss 54. When the data representative of the desired document is thus accessed, the background print controller 53 invokes print converter 55 by step 47. As a result, the data stream representative of the document to be printed is applied to print converter 55 over buss 56 wherein it is stored in an internal input buffer in the converter. Printer converter 55 then proceeds to convert the data stored in the input buffer by reading the data stored in the input buffer and applying predetermined conversion algorithms and values stored in tables in conversion control block 57 to convert the data into a sequential print data stream which is applicable to document production access method utilized in the present system.

The sequential print data stream which is thus formed, step 48 of FIG. 4, also contains the integrated graphics information. The resulting sequential data stream is then stored in a suitable output buffer (not shown) associated with print converter 55 and, step 49, the process is returned to the background print controller 53. At this point, background print controller 53 invokes the document production access method, step 58. Then, under the control of this document production access method 71, FIG. 2, the process set forth in FIG. 5 involving the selective application of alphanumeric data to the printer and graphic data to a plotter is carried out.

First, step 59, a determination is made as to whether the next section of data in the data stream is representative of graphics or alphanumeric data. The data stream contains a series of prefixes which are used to identify the graphic and alphanumeric data and to distinguish such portions of the data stream from each other. If the data is not graphic in nature, then, step 60, the access method proceeds in a conventional manner to form a sequence or string of alphanumeric character printing commands which are in turn applied to a suitable printer interface 61. This character data stream will be stored in any conventional storage means at the printer interface so that when the print command is subsequently given, the alphanumeric portion of the document may be printed on printer 10. Next, decision step 62, a determination is made as to whether the end of the accessed document has been reached. If it has not, then the process is returned to decision block 59 where a determination is again made as to whether the next portion of the data is graphic or alphanumeric in nature. If the next portion of the data is graphic, then, a determination is made in the access method 71 as to the space requirement of the graphic material, step 63. This is based upon scanning the material, and determining the various coordinate points at the extremities of the graphic and allocating appropriate space on the document to accommodate such graphic material. Next, step 64, the graphic data is applied to plotter formatter 67 which converts the various coordinate and coordinate related information into an appropriate format sufficient to drive the particular plotter being utilized. The formatter 67 uses a conventional data stream interpreter to transform the graphic data stream elements into the device specific commands required by the specific plotter. An example of such a conventional device specific command stream is HP-GL which is supported by most Hewlett Packard Pen Plotters.

Next, a determination is made as to whether the end of the document has been reached, step 62. If it has, then, we are ready to produce the final document. This document production will require two operations, one on the plotter and one on the printer. First, the medium such as paper on which the document is to be formed is inserted into the plotter. The drawing of the graphic portion of the document on the plotter is then commenced, step 66. During the plotter drawing step, the plotter operates in its conventional manner to implement the formatted data for the plotter which has been stored at the plotter interface 68 of FIG. 2 in step 64. After all of the graphics have been formed on the plotter, the document is then transferred to the printer 10 where the data stream stored at the printer interface is now printed out, step 69, in the conventional manner to produce the alphanumeric portion of the document. This combined plotting and printing operation may conveniently be carried out page by page on a document involving a plurality of pages.

While the invention has been particularly shown and described with reference to a preferred embodiment it will be understood by those skilled in the art that various other changes in form and detail may be made without departing from the spirit and scope of the invention.

We claim:

1. A word processing system comprising:
   interactive display terminal means for receiving data representative of alphanumeric characters and data representative of graphics, and for displaying alphanumeric characters and graphic information;
   means for integrating said alphanumeric character data and said graphic data from said terminal means into a data stream;
   a character generator, connected to the data stream and responsive to the alphanumeric character data, for generating said alphanumeric characters for display on said terminal means from said data representative of alphanumeric characters from said data stream;
   means, connected to the data stream and responsive to the graphic data, for converting said data representative of graphics from said data stream into graphic characters and for providing said graphic characters to said character generator to display said characters on said terminal means;
   means, connected to the data stream and responsive to the alphanumeric character data and the graphic data, for selectively applying the data in said data stream representative of said alphanumeric characters to a printing means, and for selectively applying the data in said data stream representative of said graphics to an illustrating means;
   said printing means, responsive to the selectively applying means, for printing said alphanumeric characters on a document from said data representative of alphanumeric characters; and
   said illustrating means, responsive to the selectively applying means, for producing graphic information on said document from said data representative of said graphics in a format different from said graphic characters or said alphanumeric characters.

2. A word processing system comprising:
   interactive display terminal means for receiving data representative of alphanumeric characters and data representative of graphics, and for displaying alphanumeric characters and graphic characters;
   means for integrating said alphanumeric character data and said graphic data from said terminal means into a data stream;
   a character generator, connected to the data stream and responsive to the alphanumeric character data and said graphics data, for generating said alphanumeric characters from said data representative of alphanumeric characters of said data stream and, for generating said graphic characters from the data representative of graphics of said data stream and for providing said alphanumeric characters and said graphic characters to said terminal for display;
   means, connected to the data stream and responsive to the alphanumeric character data and the graphics data, for selectively applying the data in said data stream representative of said alphanumeric characters to a printing means, and for selectively applying the data in said data stream representative of said graphics to an illustrating means;
   said printing means, responsive to the selectively applying means, for printing said alphanumeric characters on a document from said data representative of alphanumeric characters; and
   said illustrating means, responsive to the selectively applying means, means for producing graphic information on said document from said data representative of said graphics in a format different from said graphic characters and said alphanumeric characters.

3. A word processing system according to claim 1 wherein said means for selectively applying data separates the data representative of alphanumeric characters from said data representative of graphic information for application to the printing means and illustrating means respectively and said printing means prints only said alphanumeric characters on said document and said illustrating means produces only said graphic information on said document.

4. A word processing system according to claim 2 wherein said means for selectively applying data separates the data representative of alphanumeric characters from said data representative of graphic information for application to the printing means and illustrating means respectively and said printing means prints only said alphanumeric characters on said document and said illustrating means produces only said graphic information on said document.

5. A word processing system according to claim 1 wherein said printing means prints said alphanumeric characters only by impact printing of fixed character symbols.

6. A word processing system according to claim 2 wherein said printing means prints said alphanumeric characters only by impact printing of fixed character symbols.

* * * * *